June 6, 1933. H. S. HOLMES 1,913,029
WELDING MACHINE
Filed April 18, 1928 8 Sheets-Sheet 3

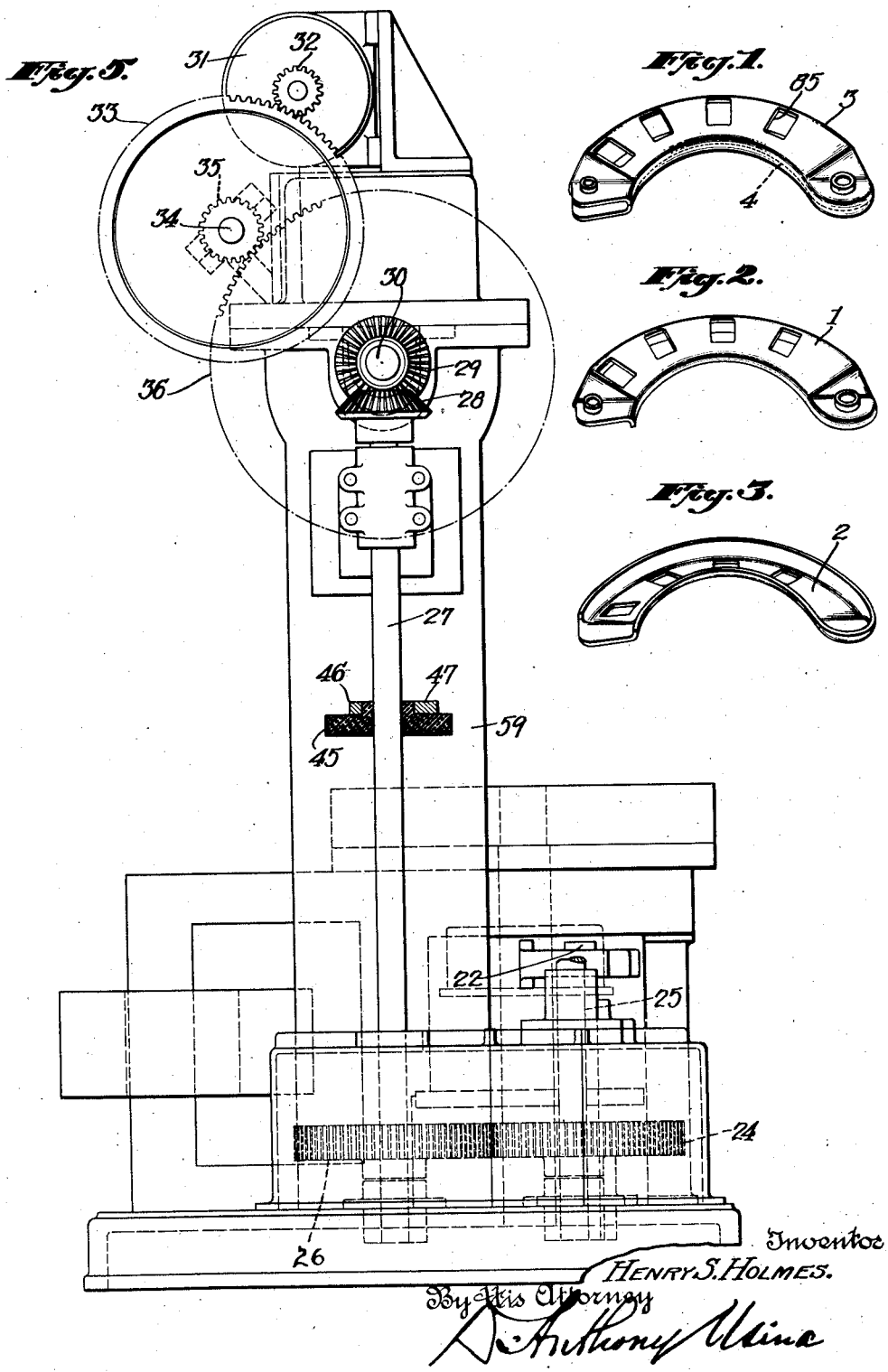

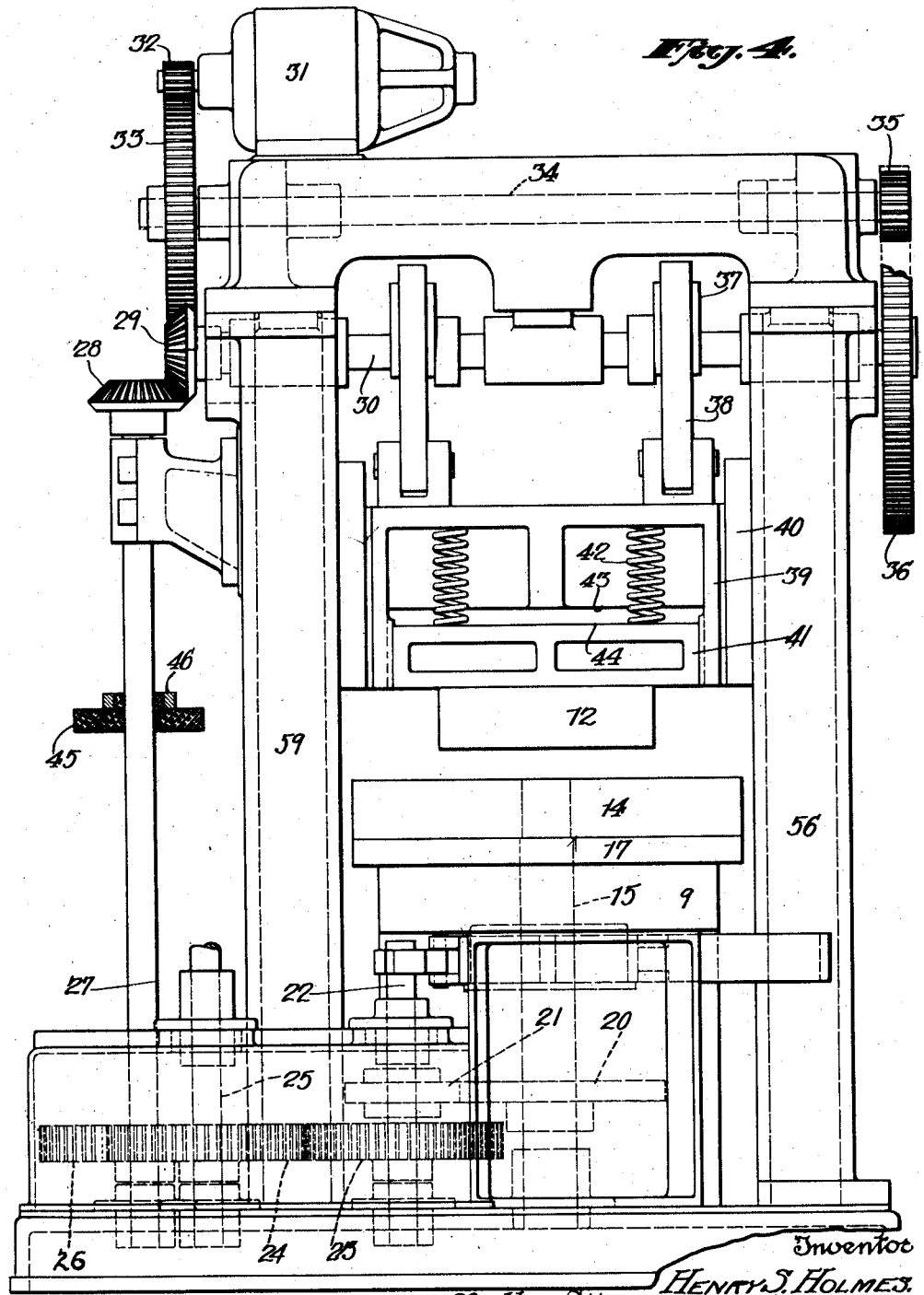

Inventor
HENRY S. HOLMES.
By his Attorney

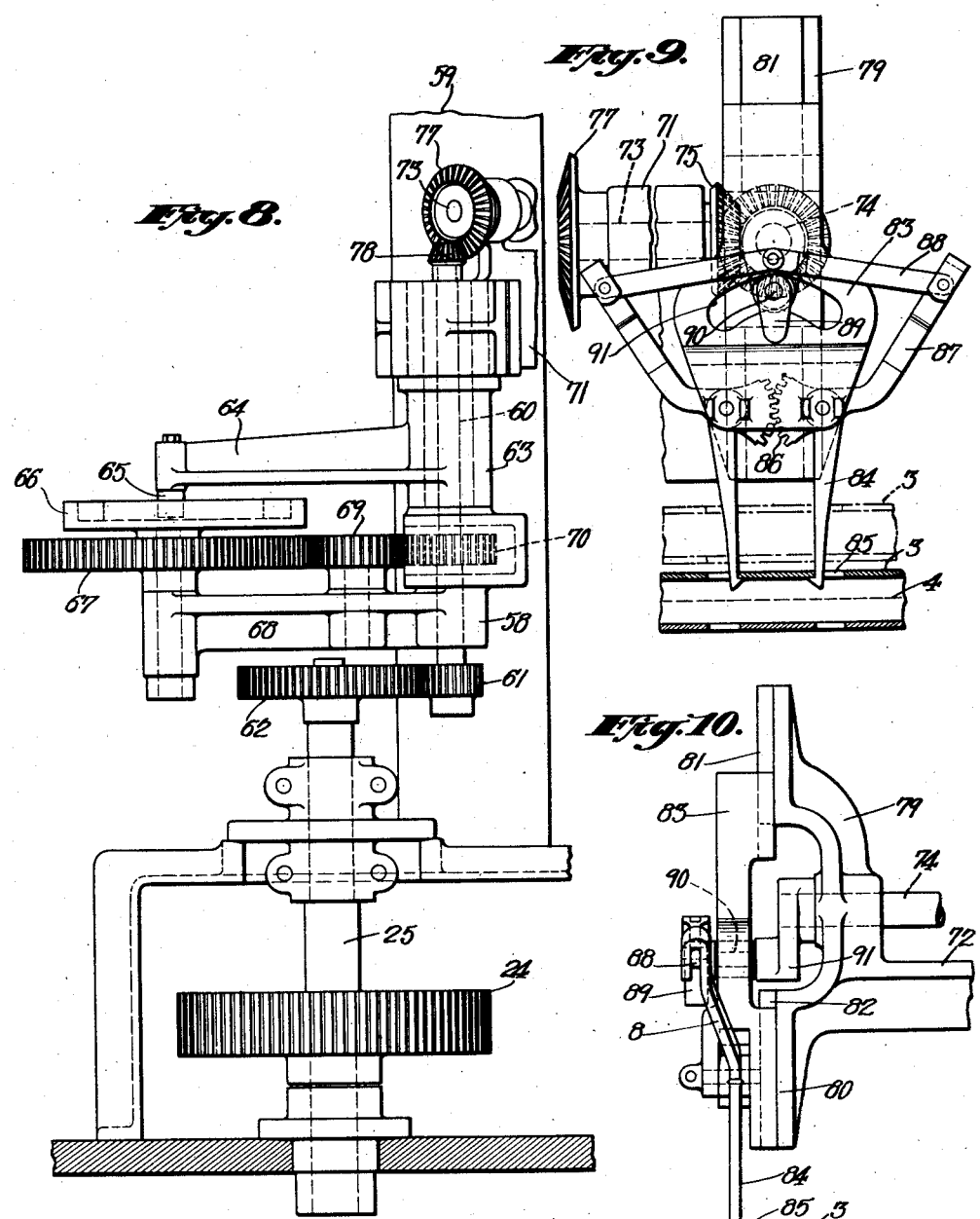

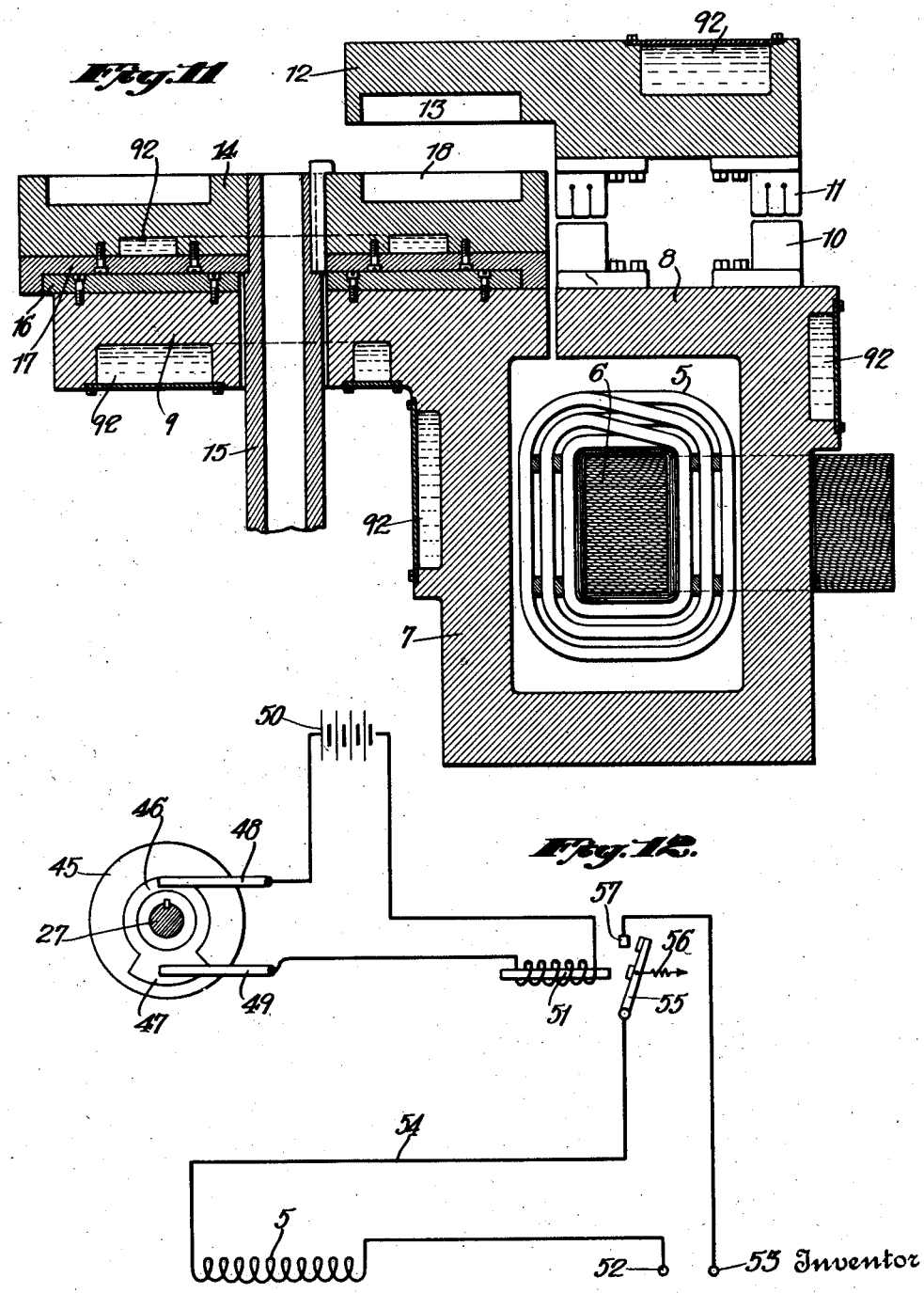

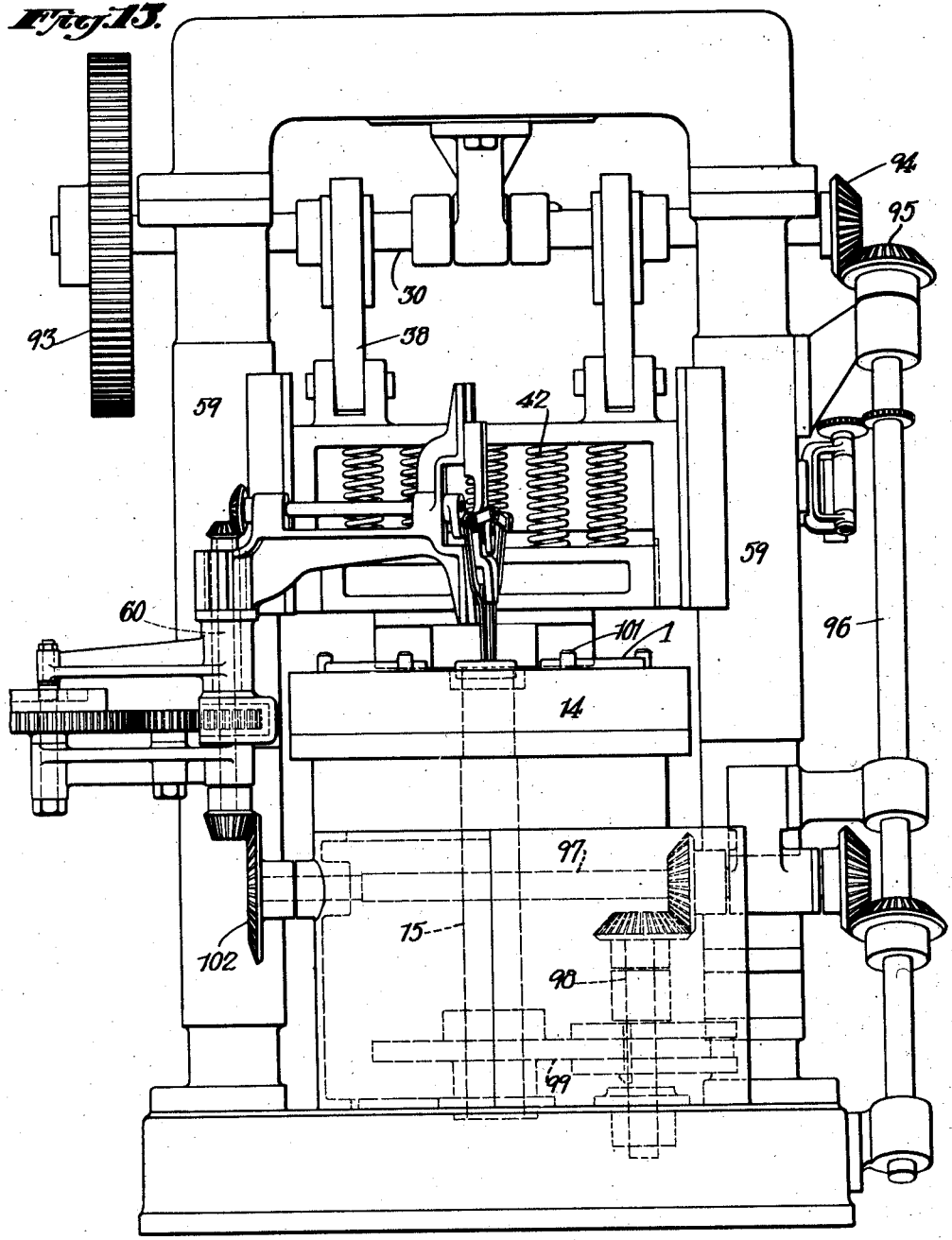

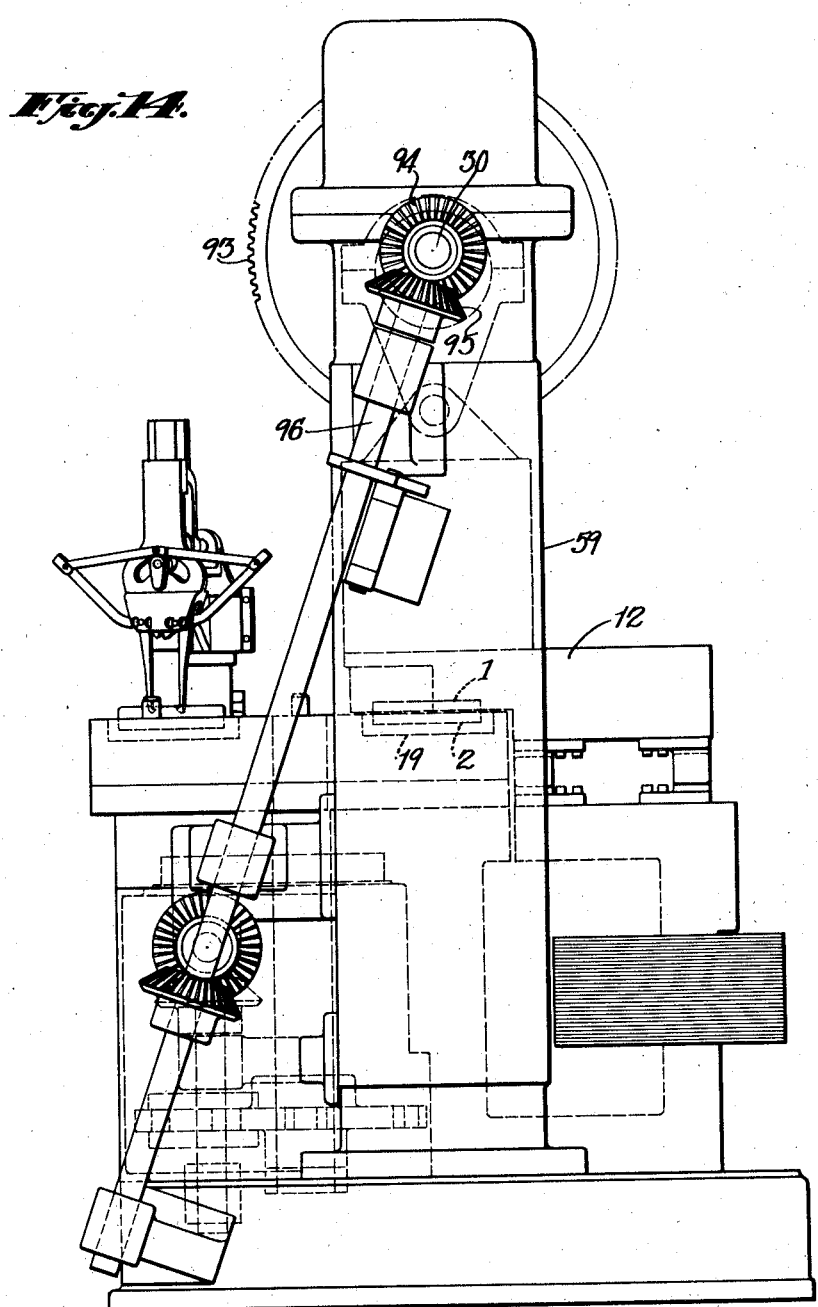

June 6, 1933.  H. S. HOLMES  1,913,029
WELDING MACHINE
Filed April 18, 1928   8 Sheets-Sheet 8
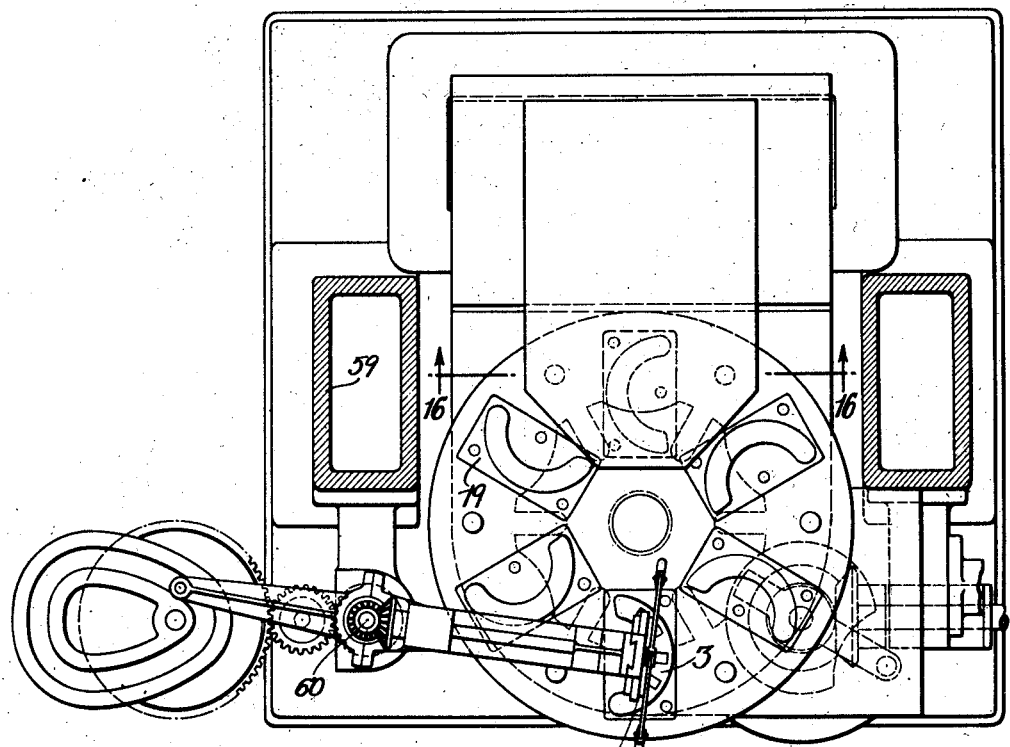
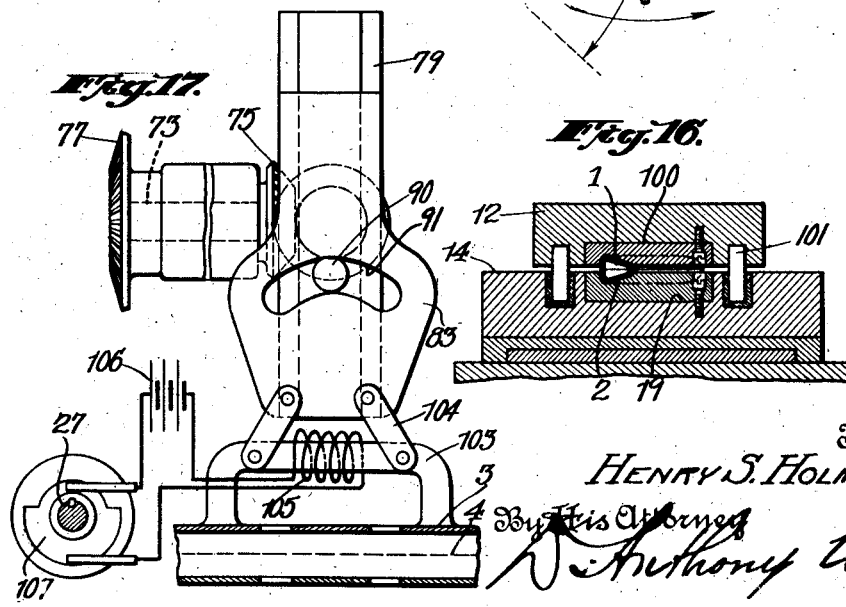
Inventor
HENRY S. HOLMES.
By his Attorney
Anthony Usina Patented June 6, 1933

1,913,029

UNITED STATES PATENT OFFICE

HENRY S. HOLMES, OF NEW YORK, N. Y., ASSIGNOR, BY MESNE ASSIGNMENTS, TO METROPOLITAN ENGINEERING COMPANY, OF NEW YORK, N. Y., A CORPORATION OF NEW YORK

WELDING MACHINE

Application filed April 18, 1928. Serial No. 270,851.

The improved machine is designed especially, though not solely, for making comparatively large butt welds and turning out the welded articles at a high rate of production with a small amount of labor.

The accompanying drawings illustrate embodiments of the invention.

Fig. 1 is a perspective of a welded brake shoe for automobiles for which the particular machine illustrated has been designed and used;

Figs. 2 and 3 are similar views of the segments before welding;

Fig. 4 is a front elevation of the welding machine;

Fig. 5 is a left side elevation thereof;

Fig. 8 is a front elevation of part of the pick-out device, the view being in the direction of the arrow 8, Fig. 7;

Fig. 9 is an elevation of another part in the direction of the line 9, Fig. 7;

Fig. 10 is a side elevation of the parts shown in Fig. 9;

Fig. 11 is a section from front to back through the transformer and electrodes;

Fig. 12 is a diagram of electrical connections;

Fig. 13 is a front elevation of another embodiment of the invention;

Fig. 14 is a right hand side elevation of the same;

Fig. 15 is a plan of the work carrier of the same and the pick-out mechanism, the adjacent parts in section;

Fig. 16 is a vertical section through the electrodes and adjacent parts on the line 16—16, Fig. 15.

Fig. 17 is a view like Fig. 9 of another pick-out device.

Figure 6:
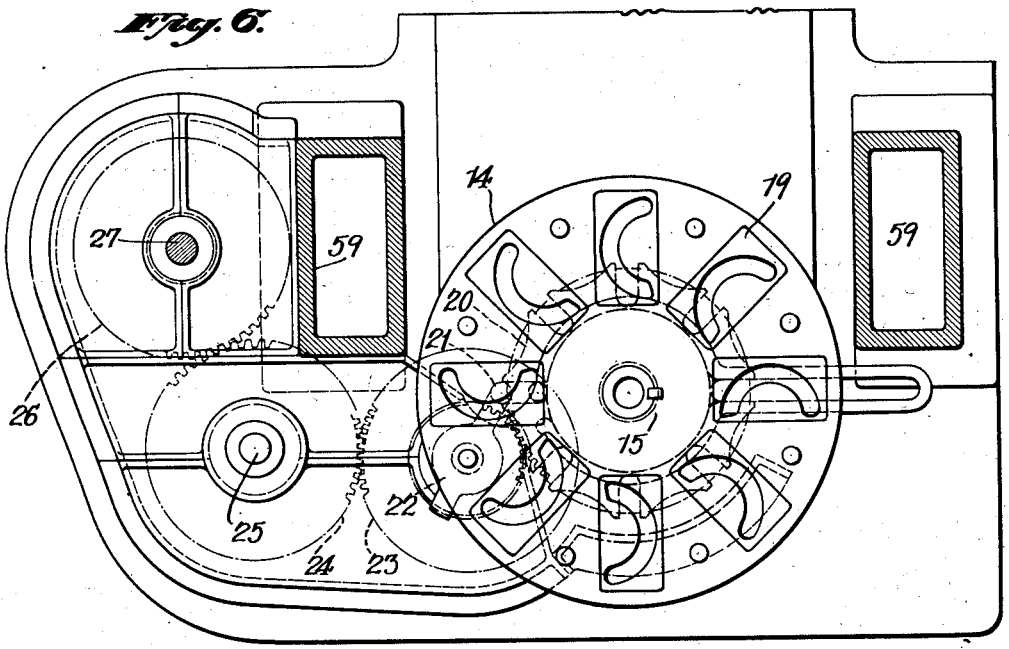
Fig. 6 is a plan of the work carrier and operating mechanism, with adjacent parts in section.

The machine is designed to employ the Murray method of butt welding in which a current of extremely high amperage is passed across the joint for a very brief interval (measured generally in fractions of a second) and the parts are pressed together to unite them. See Reissue Patent No. 15,466, filed October 10, 1922. For this purpose large and heavy electrodes of good conducting metal are used to exert the pressure and convey the current to the work and a heavy press is required.

In Figs. 2 and 3 are shown two segments 1 and 2 which are to be welded together to make a brake shoe 3, Fig. 1, for automobiles. Each of the segments is of channel shape in cross section and curved in its length with holes in the web and a flange extending nearly around its periphery. The edges of the flanges of the two segments are arranged in contact and welded together along the joint 4, Fig. 1.

Fig. 11 shows a transformer with a primary winding 5 about an iron core 6 surrounded by a secondary consisting of a copper casting 7. The upper part of the secondary is split to form two poles 8 and 9 in the form of horizontal shelves. The shelf 8 carries switch blades 10 adapted to be engaged by corresponding blades 11 on the upper electrode holder 12 when the latter is lowered, and to be disengaged when it is raised. The holder 12 has a recess 13 to receive an electrode which in turn has a recess on its under face fitting the top of the intended work.

On the opposite terminal 9 of the secondary casting there is carried a dial or turntable 14. This is keyed to a hollow shaft 15 passing downward through the shelf 9. On top of the shelf is a circular bearing plate 16. Fastened on the under side of the table is a similar bearing plate 17 with a flange surrounding the plate 16 to guide the table in its rotary movement.

The table has a number of recesses 18 in its upper face to receive electrodes which are recessed to fit the under side of the work. To secure good electrical conductivity and also good bearing qualities, the discs or plates 16 and 17 may be made of different kinds of phosphor bronze; one, for example, being of 80 parts copper, 10 tin and 10 lead, and the other of 88 parts copper, 10 tin and 2 zinc, with enough phosphorus in each case to serve as a deoxidizer. The electrode holders 12 and 14 are preferably made of copper, as are also the electrodes.

These parts of the structure have to be designed to carry extraordinarily large currents. The table alone weighs more than a ton, which will give an idea of the quantity of copper in the machine, and of the importance of having the plates 16 and 17 of metal having good bearing qualities combined with good electrical conductivity.

The table carries eight electrodes 19 (Figs. 6 and 7) each in one of the recesses 18. The shaft 15 is indexed or turned intermittently through one-eighth of a revolution, to bring the lower electrodes (loaded with the work) in turn under the upper electrode, whereupon the latter is moved downward to perform the welding and then lifted and held up while the table rotates through the next step.

The intermittent movement is obtained through a Geneva stop mechanism at the lower end of the shaft 15. This is a common movement and requires no detailed showing. The shaft carries a slotted star wheel 20. A rotating crank 21 engages the slots in succession, moving into the slot, turning the star wheel and shaft one-eighth of a revolution and then moving out of the slot. The star is then held stationary until the crank 21 completes its rotation and enters the next slot to give the parts another turn. The crank is mounted on a short shaft 22 which has at its lower end a spur gear 23 meshing with a gear 24 on a short shaft 25. The gear 24 in turn is driven by a gear 26 on the lower end of a shaft 27 which at its upper end has a bevel gear 28 driven by a similar gear 29 on the projecting end of the crank shaft 30.

The crank shaft is driven by an overhead motor 31 transmitting its motion through pinion 32 to gear 33 on overhead shaft 34 and thence through pinion 35 to gear 36 on the crank shaft. The motion is transmitted through cranks 37 and links 38 to a slide 39 moving in vertical guides 40.

The slide or plunger 39 carries a supplemental plunger 41 which on its under side supports the upper electrode carrier 12. The plunger 41 is arranged to slide upward in guiding grooves in the side portions of the plunger 39 and is pressed downward to its lower limit, shown in Fig. 4, by springs 42 bearing at opposite ends against the respective plungers.

Assuming the work to be in place, the crank shaft lowers the two plungers until the upper electrode bears on the work. This will close the switches 10 and 11 of the secondary circuit of the transformer. The primary circuit will remain open for a time. The continued movement will compress the springs 42 and hold the work pieces together under such spring pressure.

During this movement the primary circuit will be closed by a control switch to pass the welding current across the joint. The continued movement will bring the lower edge 43 of the main plunger against the top 44 of the supplementary plunger and will thus apply a rigid pressure to force the heated edges of the work together, at which time the welding current is automatically stopped by opening the primary circuit. The weld is thus started under the yielding pressure of the springs 42 and completed by a rigid pressure or blow from the crank shaft.

The control of the current is illustrated in Fig. 12. On the shaft 27 there is mounted a disc 45 of fiber or other insulating material carrying a brass ring 46 and sector 47. A brush 48 rests on the ring and another brush 49 rests on the sector 47 so as to make contact and complete the circuit during a part of the revolution of the shaft corresponding to the length of the sector.

The brush 48 is connected to one terminal of a source of electric supply, indicated at 50, the opposite terminal of which leads through the coil of a magnet 51 to the brush 49. The alternating current supply comes from the terminals 52 and 53. The terminal 52 is connected to one end of the primary winding 5 of the transformer, of which the opposite end leads through a conductor 54 to a switch 55 which is normally held open by a spring 56 and which closes against a contact 57 which is connected to the terminal 53.

As long as the contact is maintained between the sector 47 and the brush 49, the magnet 51 holds the switch 55 of the primary circuit closed, and the welding current is maintained. When the sector 47 passes beyond the brush 49, the switch 55 opens and the welding current is discontinued.

The details of the electrical equipment are not illustrated. They may be arranged in various ways and mounted on various parts of the machine. For example, there is illustrated in Figs. 4 and 5 a suitable location for the disc 45 on the vertical shaft 27.

The work may be introduced into the lower electrodes by hand and the welded product removed by a hand tool, such as a pair of tongs. Preferably, however, I provide an automatic pickout mechanism. Such a mechanism is illustrated in Figs. 7 to 10. It may be driven from the shaft 25. A bracket 58, mounted on the upright 59, carries a vertical shaft 60 which has a pinion 61 on its lower end driven by a gear 62 on the top of the shaft 25. Mounted to rock about the shaft 60 is a bracket having a tubular portion 63 with an arm 64 at its lower end carrying a pin with a roller 65 entering a groove in a cam 66 which carries a gear 67, the cam and gear being on a vertical shaft mounted in an arm 68 projecting from the fixed bracket 58.

The arm 68 carries an intermediate pinion 69 meshing with the gear 67 and with a driving pinion 70 on the shaft 60.

Figure 7:
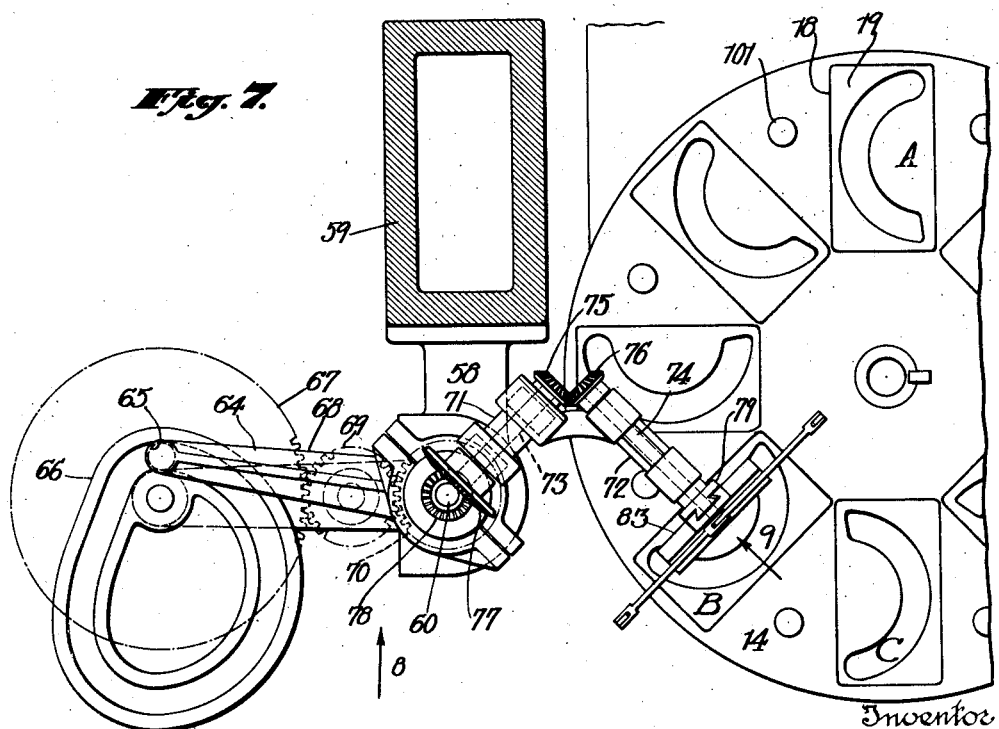
Fig. 7 is a plan of a pick-out device for removing the work from the carrier.

The tubular part 63 has at its upper end an extension of the angular shape shown in Fig. 7 comprising a portion 71 and a second portion 72, providing bearings for shafts 73 and 74 which carry meshing bevel gears 75 and 76 on their ends. The shaft 73 has on its forward end a bevel pinion 77 driven by a pinion 78 on the upper end of the vertical shaft 60. The arm 72 of the swinging bracket carries at its forward end a vertical extension 79 carrying one of the hubs for the shaft 74 and a downward extension 80; these extensions carrying vertical guide ribs 81 and 82 in line with each other.

As the vertical shaft 60 is driven, therefore, the cam will be rotated and will swing the bracket carrying the shaft 74 from the position of Fig. 7 to a position clear of the dial. The shaft 74 is at the same time continuously rotated. On the front of the arm 72 and having a sliding engagement with the guides 81 and 82 there is a carried plate 83 which carries the hooks or fingers 84 designed to enter holes 85 in the work and then come together as in Fig. 9 and lift it out of its recess in the dial, swing it clear and then release it.

The fingers 84 are pivoted to the lower part of the carrier 83 and have segmental toothed extensions 86 meshing together to synchronize the two fingers. Each finger has also an outward arm 87 and the outer ends of these arms are connected to each other by means of links 88, the pivoted ends of which rest on a cam 89 carried on the end of a crank pin 90 which is in the end of a crank 91 on the end of the shaft 74. The crank pin 90 carries a roller which passes through a slot 91 in the carrier 83 and travels freely therein.

Starting from the position of Fig. 9, as the shaft 74 rotates the crank pin 90 lifts the plate 83 and the fingers and the welded brake shoe 3 from the position illustrated in full lines to that shown in dotted lines, so that it clears the dial plate. Shortly after the commencement of the lifting operation, the cam 66 swings the carrier 63 on the vertical axis of the shaft 60, swinging the work out beyond the edge of the dial plate. The continued rotation of the shaft 74 causes the cam 89 to lift the connected ends of the links 88 which pulls the arms 87 inward and throws out the hooked ends of the fingers 84, dropping the work. The continued movement of the cam restores the fingers to a position over the dial plate. The latter in the meantime brings the next completed piece to the position for removal. And the rotation of the shaft 74 drops the fingers 84 into the holes in the work and allows their hooked ends to come together to the position of Fig. 9.

The welding takes place at the rearmost electrode A, Fig. 7. This is directly over the vertical portion 7 (Fig. 11) of the secondary. Thus the support for the welding blow is taken directly on the portion 7 acting in the manner of a column; and the lateral extension 9 has only to carry the weight of the turntable. Also the electrode where the work is done is that one which is closest to the arm 7, thus providing for the passage of the current through the shortest path.

The removal of the work is effected at the electrode B, Fig. 7. The electrode in position C will always be empty and the operator inserts new pieces at this or the next position. The turntable projects well forward of the frame 59 of the machine so as to render easily accessible the stations at which the work is introduced and removed.

The welder can be run at a speed that will weld up to twelve hundred pieces per hour, depending on the ability of the operator or operators to feed it. While only three stations are needed for welding, removing and refilling, a larger number of stations is advantageous in giving time for the work to cool and particularly for the electrodes to cool before they return to the welding station. The current-carrying parts and particularly the electrode carriers are also cooled by water jackets or recesses at suitable points as illustrated at 92 in Fig. 11.

If the shape of the welded article does not provide holes or shoulders that are easily gripped by tongs or pick-out mechanism of the kind illustrated, an electromagnet may be substituted which is energized and deenergized to lift and drop the work. Such a magnet has the additional advantage that it will pick out with the article the small particles of metal which will have burned off during the weld. To secure this operation I may also magnetize the mechanical fingers or similar devices. Or I may provide in addition a blast of air to clean out the recess in the electrode before inserting new pieces.

Figs. 13 to 16 illustrate a machine with a different arrangement of parts and with different details, which are also applicable to the machine of the previous figures. The motor drives a gear 93 on the crank shaft 30, on the other end of which is a pinion 94 driving a pinion 95 on an inclined shaft 96. This shaft drives a horizontal shaft 97 which drives a short vertical shaft 98 operating a Geneva movement 99 on the shaft 15 of the turntable 14 carrying the lower electrodes.

In these figures there are illustrated also the segments 1 and 2 in the lower electrodes 19 and the upper electrode 100. The turntable 14 carries insulated pins 101 with tapered upper ends which fit in sockets in the upper electrode carrier 12 so as to ensure accurate alignment during the welding operation.

The pick-out device is identical with that of the previous figures. The main shaft 60 thereof is driven from a bevel gear 102 on the end of the horizontal shaft 97.

A magnetic pick-out is illustrated in Fig. 17. The slide 83 is operated by the crank pin 90 as explained in connection with Fig. 9. On the lower end of the slide there is an iron yoke 103 supported from the slide by brass links 104. A coil 105 is wound on the yoke and has its terminals in circuit with a source of supply 106 and a switch 107 similar to that of Fig. 12 and mounted on the same shaft 27. The sector of this switch is set at such an angle as to magnetize the yoke 103 when it is lowered into contact with the welded product 3 and to demagnetize the sector when the arm swings the product clear of the table.

Various other modifications may be made by those skilled in the art without departing from the invention as defined in the following claims.

What I claim is:

1. An electric welding machine of the resistance type with opposite electrodes adapted to fit the opposite pieces of the work and to convey current of large amperage thereto, said machine having a reciprocating upper electrode and a horizontal turntable carrying a plurality of lower electrodes and means for indexing said turntable to bring said lower electrodes successively in line with the upper electrode.

2. A welding machine of the character described including in combination a transformer, the secondary of which has a heavy vertical column with a lateral extension, a rotatable electrode carrier supported on said column and extension and carrying a number of electrodes adapted to be brought in succession over said column as the carrier is rotated and a vertically reciprocating electrode in line with said column.

3. An electric welding machine including in combination a vertically reciprocating upper electrode, a turntable carrying lower electrodes adapted to be brought in succession into line with the upper electrode, a transformer having a secondary with an arm on which the turntable is supported and bearing plates between the turntable and the arm of bronze of two different compositions having good bearing qualities combined with good electrical conductivity.

4. A welding machine of the character described including in combination a vertically reciprocating upper electrode, a turntable carrying lower electrodes adapted to be brought successively into line with the upper electrode to effect the weld and mechanism for lifting the welded articles from the lower electrodes in succession.

5. A welding machine of the character described including in combination a vertically reciprocating upper electrode, a turntable carrying lower electrodes adapted to be brought successively into line with the upper electrode to effect the weld and mechanism for lifting the welded articles from the lower electrodes in succession, the welding station being located within the main frame of the machine and the lifting station being clear of said main frame.

6. A welding machine of the character described including in combination a vertically reciprocating upper electrode, a turntable carrying lower electrodes adapted to be brought successively into line with the upper electrode to effect the weld and magnetic and mechanical mechanism for removing the molded article and any loose particles of metal from the lower electrodes in succession.

7. An electric welding machine of the resistance type with opposite electrodes adapted to fit the opposite pieces of the work and to convey current of large amperage thereto and means for pressing the electrodes toward each other under spring pressure at the beginning of the weld and pressing them together with a rigid blow during the completion of the weld and means for bringing successive electrodes in position for pressing together.

8. An electric welding machine of the resistance type with opposite electrodes adapted to fit the opposite pieces of the work and to convey current of large amperage thereto, said machine having a reciprocating electrode and a turntable carrying a plurality of opposite electrodes and means for indexing said turntable to bring said electrodes successively in line with said reciprocating electrode.

9. An electric welding machine of the resistance type with opposite electrodes adapted to fit the opposite pieces of the work and to convey current of large amperage thereto, said machine having a reciprocating electrode and a means carrying a plurality of opposite electrodes and means for moving said carrying means to bring said electrodes successively in line with said reciprocating electrode.

10. An electric welding machine of the resistance type with opposite electrodes adapted to fit the opposite pieces of the work and to convey current of large amperage thereto, said machine having a reciprocating electrode and a means carrying a plurality of opposite electrodes, means for moving said carrying means to bring said electrodes successively in line with said reciprocating electrode and means for automatically removing welded articles from said electrodes after welding.

11. An electric welding machine of the resistance type with opposite electrodes adapted to fit the opposite pieces of the work and to convey the current of large amperage thereto, said machine having a reciprocating upper electrode and a turntable carrying a plurality of lower electrodes and means for indexing said turntable to bring said lower electrodes successively in line with the upper electrode.

12. A welding machine of the character described including in combination a reciprocating upper electrode, a turntable carrying lower electrodes adapted to be brought successively into line with the upper electrode to effect the weld and mechanism for moving the welded articles from the lower electrodes in succession.

13. An electric welding machine having a reciprocating electrode adapted to fit the opposite pieces of the work and to convey current thereto, a plurality of complementary electrodes carrying work pieces to be welded, means for carrying said second electrodes into and out of line with said reciprocating electrode, and fingers movable to engage and lift the work pieces from one of said second electrodes when said electrode is out of line with said reciprocating electrode.

14. A welding machine of the character described including in combination a reciprocating upper electrode, a turntable carrying lower electrodes adapted to draw successively into line with the upper electrode to effect the weld and to then be removed out of line with said upper electrode, work engaging fingers, means for moving said fingers to a position to engage a work piece in siad lower electrode out of line with said upper electrode, and means for moving said fingers into engagement with a work piece when lowered into contact therewith.

15. A welding machine comprising a welding point, a rotary table carrying a plurality of work supporting devices each provided with a welding point, and means for moving the table with step by step movement to successively present the welding points on the table to the first mentioned welding point.

16. A welding machine comprising a welding point, a rotary table carrying a plurality of work supporting devices each provided with a welding point, means for moving the table with step by step movement to successively present the welding points on the table to the first mentioned welding point, and means for bringing welding points which are in juxtaposition toward each other to effect welding in timed relation with the step by step movement of the table.

17. A welding machine comprising an electrode holder adapted to retain either a butt, spot, or projection welding electrode, a rotary table carrying a plurality of electrode holders each adapted to retain either a butt, spot or projection welding electrode, and means for moving the table with a step by step movement to successively present the welding electrodes on the table to the first mentioned welding electrode.

In witness whereof, I have hereunto signed my name.

HENRY S. HOLMES.